United States Patent [19]

Ohmori

[11] 4,284,746

[45] Aug. 18, 1981

[54] PERFLUOROALKYL-SUBSTITUTED AMINES AS EPOXY RESIN CURING AGENTS

[75] Inventor: Akira Ohmori, Ibaraki, Japan

[73] Assignee: Daikin Kogyo Co., Ltd., Osaka, Japan

[21] Appl. No.: 84,436

[22] Filed: Oct. 12, 1979

[30] Foreign Application Priority Data

Oct. 14, 1978 [JP] Japan .................................. 53-126505
Oct. 14, 1978 [JP] Japan .................................. 53-126507

[51] Int. Cl.$^3$ .............................................. C08G 59/50
[52] U.S. Cl. ...................................... 525/510; 528/27; 528/98; 528/99; 528/111; 528/116; 528/121; 528/123; 528/365; 528/401
[58] Field of Search .................... 528/99, 98, 111, 116, 528/27, 121, 123, 365, 401; 525/510

[56] References Cited

U.S. PATENT DOCUMENTS 3,458,571 7/1969 Tokoli .................................. 260/556

FOREIGN PATENT DOCUMENTS 1219243 1/1971 United Kingdom .
1264331 2/1972 United Kingdom .

*Primary Examiner*—Earl A. Nielsen
*Attorney, Agent, or Firm*—Birch, Stewart, Kolasch & Birch

[57] ABSTRACT

An epoxy resin composition which comprises (1) an epoxy resin having at least two epoxy groups per molecule and (2) an amine having at least one perfluoroalkyl group and at least one primary and/or secondary amino groups per molecule can be readily cured to afford a cured product, which shows excellent water resistance, oil resistance and stainproof property.

16 Claims, No Drawings

PERFLUOROALKYL-SUBSTITUTED AMINES AS EPOXY RESIN CURING AGENTS

The present invention relates to an epoxy resin composition. More particularly, it relates to an epoxy resin composition which can be readily cured to afford a cured product having excellent physical properties.

Compositions containing epoxy resins as prepolymers and curing agents show a good close-adhering property to various kinds of substrates and are thus useful for paints and adhesives. Cured products of such compositions are employed in laminates, materials for civil engineering and construction, electrical assemblies, etc. However, such cured products are not satisfactory in water resistance, oil resistance, stainproof property, etc.

As the result of an extensive study to provide a curable epoxy resin composition which can afford a cured product having excellent physical properties, particularly satisfactory water resistance, oil resistance, stainproof property, etc., it has been found that a composition comprising an epoxy resin and a certain amine is suitable for such purpose.

The curable epoxy resin composition of the present invention comprises (1) an epoxy resin having at least two epoxy groups per molecule and (2) an amine having at least one perfluoroalkyl group and at least one primary or secondary amino group per molecule. In the composition, the epoxy resin (1) and the amine (2) may be present in a simply admixed state or in a combined state forming a compound. In the latter case, an addition compound is formed between the epoxy resin (1) and the amine (2), which is composed of, wholly or almost wholly, linear structures, not of crosslinked structures, and also contains epoxy groups.

The epoxy resin (1) as one of the essential components should contain two or more epoxy groups per molecule. When the number of epoxy groups is smaller than 2, a three dimensional structure is not formed at curing so that the physical properties of the cured product from the resulting composition is much inferior.

As the epoxy resin (1), there may be used, for instance, a polyglycidyl ether or ester obtained by the reaction of an epoxy compound, especially epichlorohydrin or an epichlorohydrin-producing substance (e.g. glycerol dichlorohydrin), with a polyhydroxy or polycarboxy compound or its alkali metal salt in the presence of a basic substance. Particularly preferred is a polyglycidyl ether prepared from a polyphenol such as resorcinol, hydroquinone and 4,4'-dihydroxydiphenyldimethylmethane. There may be also used a glycidyl ether of an aliphatic hydroxy compound (e.g. glycol, glycerol), of a phenol-formaldehyde condensation product or of a polyepoxy compound (e.g. butadiene dioxide). There may be further employed a polyglycidyl ester of an aromatic dicarboxylic acid (e.g. phthalic acid, terephthalic acid, epoxytetrahydrophthalic acid), an epoxy compound of the formula:

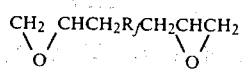

wherein $R_f$ is a $C_4$–$C_{16}$ perfluoroalkylene group, etc. These epoxy resins may be used alone or in combination. Among them, an epoxy resin of 4,4'-dihydroxydiphenyldimethylmethane is particularly preferred.

The amine (2) as one of the other essential component is a primary or secondary monoamine, diamine, triamine or polyamine containing at least one perfluoroalkyl group per molecule.

The perfluoroalkyl group may be straight, branched or cyclic, and have 1 to 15 carbon atoms, preferably 3 to 9 carbon atoms. As the number of the carbon atoms in the perfluoroalkyl group increases, the contact angle of water or oil on the surface of the cured product from the resulting composition becomes larger, and its water- and oil-repellency is improved. But, a too large number of carbon atoms will prevent the uniform admixing with the epoxy resin (1).

The amine (2) to be used in the present invention is desired to have at least one primary amino group ($-NH_2$) or secondary amino group ($>NH$), which enables uniform admixture or dissolution of the amine (2) and the epoxy resin (1). Examples of the amine (2) include ammonia, primary monoamines and primary, secondary or primary-secondary diamines, triamines and polyamines in which at least one of the hydrogen atoms linked to the nitrogen atom is substituted with a perfluoroalkyl group-containing substituent. The perfluoroalkyl group-containing substituent may be represented, for instance, by the following formula:

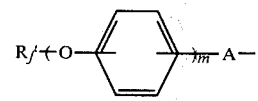

wherein $R_f'$ is a $C_1$–$C_{15}$ perfluoroalkyl group, A is a $C_1$–$C_4$ alkylene group, a $C_2$–$C_4$ alkylene group substituted with one or two hydroxyl groups, a methyleneoxy($C_3$–$C_4$)alkylene group in which one of the hydrogen atoms in the alkylene moiety is substituted with a hydroxyl group, a sulfonyl group, a carbonyl group or a phenylene group and m is 0 or 1.

The monoamine to be used as the amine (2) may be represented, for example, by the formula:

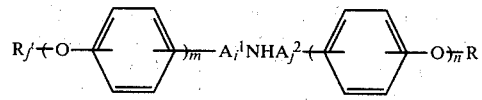

wherein $R_f'$ is as defined above, R is a hydrogen atom, a $C_1$–$C_{16}$ alkyl group, a phenyl group having or not 1 to 4 substituents selected from the group containing of halogen atoms (Cl, Br or I; hereinafter referred to the same) and $C_1$–$C_4$ alkyl groups, a phenyl($C_1$–$C_4$)alkyl group having or not on the benzene ring 1 to 4 substituents selected from the group consisting of halogen atoms and $C_1$–$C_4$ alkyl groups, a tri-($C_1$–$C_3$)alkoxysilyl group or a $C_1$–$C_{15}$ perfluoroalkyl group, $A^1$ and $A^2$ are each a $C_1$–$C_4$ alkylene group, a $C_2$–$C_4$ alkylene group substituted with one or two hydroxyl groups, a methyleneoxy($C_3$–$C_4$)alkylene group in which one of the hydrogen atoms in the alkylene moiety is substituted with a hydroxyl group, a sulfonyl group, a carbonyl group or a phenylene group and i, j, m and n are each 0 or 1, at least one of them being 1.

Specific examples of the primary and secondary monoamines represented by the above mentioned formula are as follows:

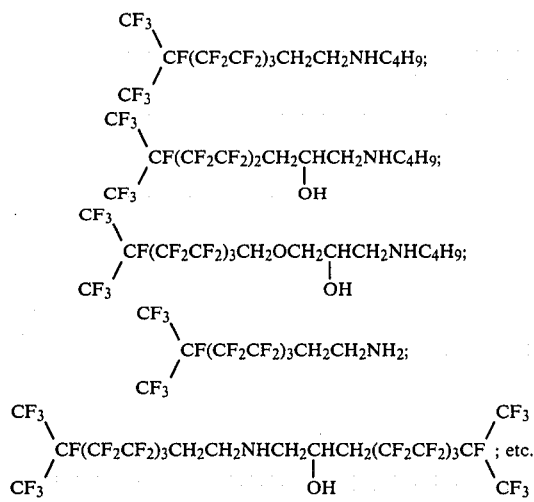

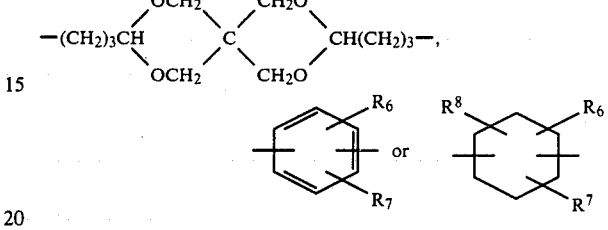

having or not 1 to 4 substituents selected from the group consisting of halogen atoms and $C_1$-$C_4$ alkyl groups, a phenyl($C_1$-$C_4$)alkyl group having or not on the benzene ring 1 to 4 substituents selected from the group consisting of halogen atoms and $C_1$-$C_4$ alkyl groups, a tri($C_1$-$C_3$)alkoxysilyl group or a $C_1$-$C_{15}$ perfluoroalkyl group, $R^5$ is a $C_1$-$C_8$ alkylene group, —$(CH_2)_r O(C_s H_{2s} O)_t$—$(CH_2)_r$— (r, s and t being each an integer of 1 to 8),

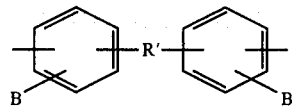

These monoamines may be prepared, for examples, by the condensation or addition reaction between ammonia or a primary amine and a compound represented by the formula:

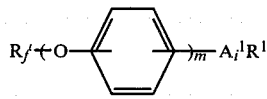

wherein $R^1$ is

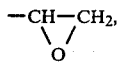

an iodine atom or a chlorine atom and $R_f$, $A^1$, i and m are each as defined above. Examples of the primary amine are ethylamine, propylamine, butylamine, pentylamine, hexylamine, octylamine, hydroxyethylamine, tri($C_1$-$C_4$)alkylsilylethylamine, aniline, etc.

In the reaction, the excess use of ammonia or the primary amine preferably prevents the loss of the fluoroalkyl group-containing compound. The presence of an inert organic solvent (e.g. ethanol, acetone, methyl ethyl ketone) promotes the reaction smoothly. The reaction is usually carried out at a temperature of about 50° to 130° C. for several hours. After completion of the reaction, the reaction product is washed with cold or warm water and, if necessary, subjected to purification by a conventional procedure such as rectification, recrystallization or reprecipitation. In many cases, a necessary purity is obtained by washing with cold or warm water.

The diamine to be used as the amine (2) may be represented, for example, by the formula:

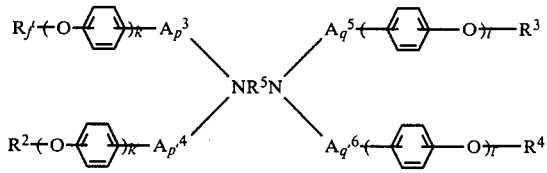

wherein $R_f$ is as defined above, $R^2$, $R^3$ and $R^4$ are each a hydrogen atom, a $C_1$-$C_{16}$ alkyl group, a phenyl group ($R^6$, $R^7$ and $R^8$ being each a hydrogen atom, a methyl group, a methoxy group, a chlorine atom or a bromine atom),

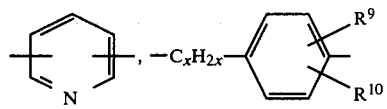

($R'$ being an oxygen atom, a sulfur atom, a sulfonyl group or a $C_1$-$C_4$ alkylene group, and B being a hydrogen atom, a methyl group, a methoxy group, a chlorine atom or a bromine atom),

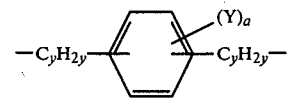

($R^9$ and $R^{10}$ being each a hydrogen atom, a methyl group or a methoxy group and x being an integer of 1 to 4),

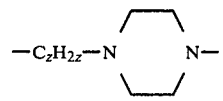

(Y being a chlorine atom or a bromine atom, y being an integer of 1 to 4 and a being an integer of 1 to 3) or $$-C_zH_{2z}-N\diagup\!\!\!\diagdown N-$$

(z being an integer of 1 to 4), $A^3$, $A^4$, $A^5$ and $A^6$ are each a $C_1$-$C_4$ alkylene group, a $C_2$-$C_4$ alkylene group substituted with one or two hydroxyl groups, a methyleneoxy($C_3$-$C_4$)-alkylene group in which one of the hydrogen atoms in the alkylene moiety is substituted with a hydroxyl group, a sulfonyl group, a carbonyl group or a phenylene group, k, k', l, l', p, p', q and q' are each 0 or 1, at least one of them being 1.

Specific examples of the diamines represented by the above mentioned formula are as follows:

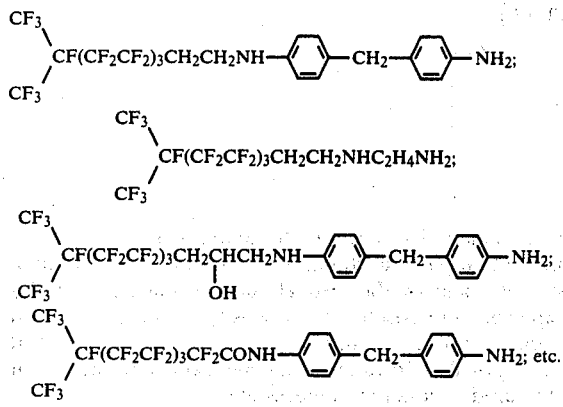

These diamines may be prepared by the reaction between a perfluoroalkyl group-containing compound such as R$_f$CH$_2$CHCH$_2$, R$_f$CH$_2$CH$_2$I, R$_f$(O—⌬—)$_k$SO$_2$Cl,
\ /
O R$_f$CH$_2$OCH$_2$CHCH$_2$, R$_f$(O—⌬—)$_k$COCl or
\ /
O R$_f$(O—⌬—)$_k$CH$_2$I (wherein R$_f$ and k are each as defined above) and an amino compound such as polymethylenediamine, polyether diamine, branched polymethylenediamine, diethylaminopropylamine, aminoethylethanolamine, methyliminobispropylamine, menthanediamine, N-aminoethylpiperazine, 1,3-diaminocyclohexane, isophorone diamine, m-xylylenediamine, tetrachloro-p-xylylenediamine, o-, m- or p-phenylenediamine, diaminodiphenylmethane, diaminodiphenyl ether, diaminodiphenylsulfone, benzidine, 4,4'-bis(o-toluidine), 4,4'-thiodianiline, dianisidine, methylenebis(o-chloroaniline), 2,4-toluenediamine, bis(3,4-diaminophenyl)sulfone, diaminopyridine, diaminoditolylsulfone, 4-chloro-o-phenylenediamine or m-aminobenzylamine.

In this reaction, the amount of the diamine, the reaction conditions and the purification procedure are substantially the same as in the preparation of the monoamine mentioned above.

The polyamine to be used as the amine (2) may be represented by the formula:

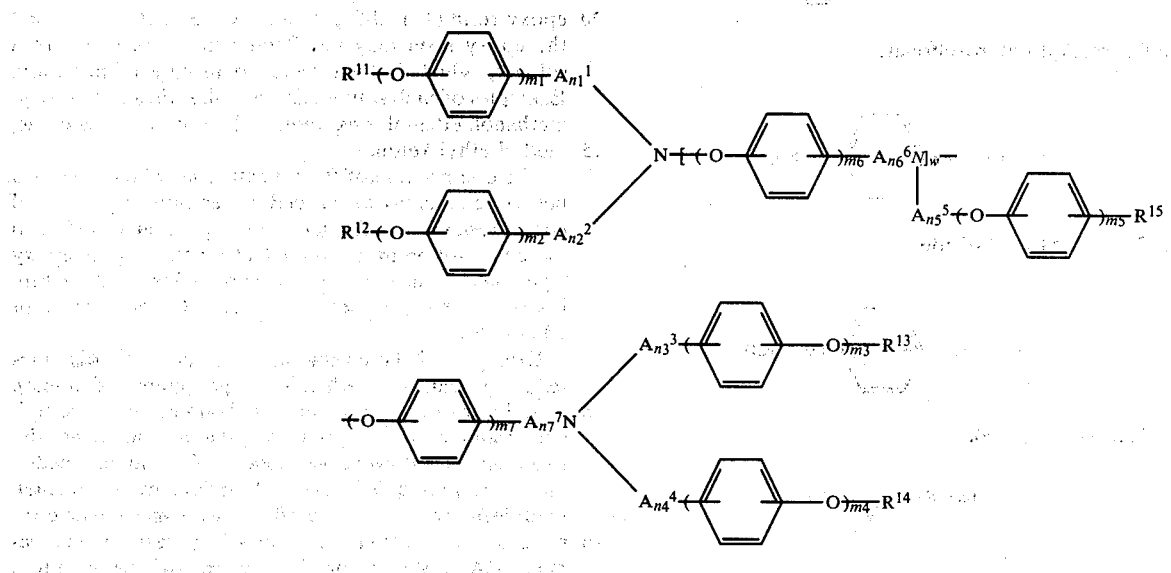

wherein $R^{11}$, $R^{12}$, $R^{13}$, $R^{14}$ and $R^{15}$ are each a hydrogen atom, a $C_1$-$C_{16}$ alkyl group, a phenyl group having or not 1 to 4 substituents selected from the group consisting of halogen atoms and $C_1$-$C_4$ alkyl groups, a phenyl(-$C_1$-$C_4$)alkyl group having or not on the benzene ring 1 to 4 substituents selected from the group consisting of halogen atoms and $C_1$-$C_4$ alkyl groups, a tri($C_1$-$C_3$)alkoxysilyl group or a $C_1$-$C_{15}$ perfluoroalkyl group, at least one of them being a perfluoroalkyl group, $A^1$, $A^2$, $A^3$, $A^4$, $A^5$, $A^6$ and $A^7$ are each a $C_1$-$C_4$ alkylene group, a $C_2$-$C_4$ alkylene group substituted with one or two hydroxyl groups, a methyleneoxy($C_3$-$C_4$)-alkylene in which one of the hydrogen atoms in the alkylene moiety is substituted with a hydroxyl group, a sulfonyl group, a carbonyl group or a phenylene group, $m_1$, $m_2$, $m_3$, $m_4$, $m_5$, $m_6$, $m_7$, $n_1$, $n_2$, $n_3$, $n_4$, $n_5$, $n_6$ and $n_7$ are each 0 or 1, at least one of m and n corresponding to R, which is a perfluoroalkyl group, being 1 and w is an integer of 1 to 10.

Specific examples of such amine (2) are as follows:

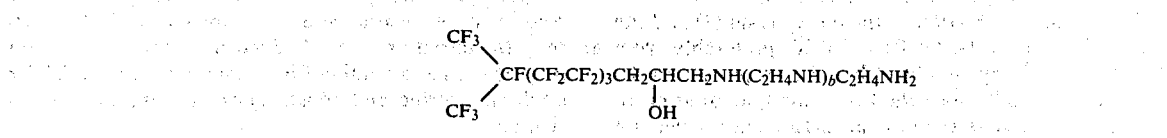

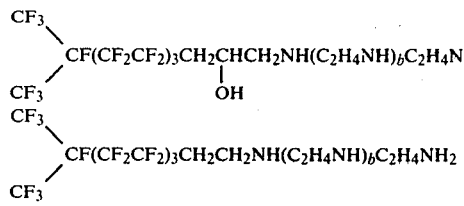
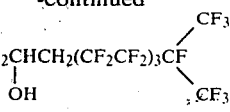

wherein b is an integer of 1 to 5.

The said polyamines may be prepared by the reaction between a perfluoroalkyl group-containing compound such as a fluoroalkyl iodide

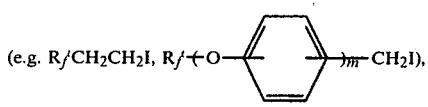

a fluoroalkyl chlorosulfonate

a fluoroalkylacryl halide

a fluoroalkylepoxide

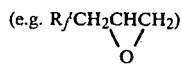

or a fluoroalkylsulfonyl chloride

($R_f$ and m in these formulae being as defined above) and an excess amount of a polyamine such as diethylene triamine, triethylenetetramine, tetraethylene pentamine, pentaethylene hexamine, iminobispropylamine, bishexamethylene triamine, methyliminobispropylamine, bis(3,4-diaminophenyl)sulfone, a low molecular weight melamine resin or a low molecular weight urea resin. The reaction is carried out for several hours under heating, for example at 50° to 130° C., in the presence of a solvent such as ethanol, acetone or methyl ethyl ketone. After the reaction, the reaction product is washed, for instance, with water or warm water to obtain the polyamine in a good yield. If necessary, the product may be further purified by an appropriate procedure such as rectification, recrystallization or reprecipitation.

The mixing proportion of the epoxy resin (1) and the amine (2) is from 99.99:0.01 to 50:50, preferably from 99.9:0.1 to 75:25 by weight. When the proportion of the amine (2) is smaller than the lower limit, a cured product having a desired low critical surface tension can not be obtained. Even when the amine (2) is used in an amount larger than the upper limit, on the other hand, improvement of the critical surface tension is hardly expected, and besides, the viscosity of the epoxy resin composition becomes extremely large to make practical use impossible. In addition, the mechanical properties of the cured product are deteriorated.

When the amine (2) is a solid whose dissolution in the epoxy resin (1) is difficult, admixture of the amine and the epoxy resin may be effected in the presence of a solvent, which is then removed in case of necessity. Examples of such solvent are monohydric alcohols (e.g. methanol, ethanol, propanol) and ketones (e.g. acetone, methyl ethyl ketone).

The composition of the invention may be cured by a per se conventional procedure employed for usual epoxy resins. For instance, a curing agent is added to the composition in an equivalent amount to the epoxy equivalent of the composition, and the resultant mixture is kept at a temperature of 5° to 200° C. for a period of 90 minutes.

Examples of the curing agent are aliphatic diamines (e.g. polymethylenediamine, polyether diamine), straight or branched aliphatic polyamines (e.g. diethylene triamine, diethylaminopropylamine, aminoethylethanolamine), alicyclic polyamines (e.g., menthanediamine, isophoronediamine, N-aminoethylpiperazine), modified amines (e.g. ethylene oxidediethylenetetramine adduct), aromatic diamines (e.g. m-phenylenediamine, 4,4'-methylenedianiline, diaminodiphenyl ether, diaminodiphenyl sulfone), secondary amines (e.g. N-methylpiperazine, piperidine), tertiary amines (e.g. N,N'-dimethylpiperazine, triethanolamine, benzyldimethylamine), boron trifluoride-monomethylamine complex, low molecular weight polymers of melamine resin, urea resin, amide resin, phenol resin and sulfido resin, acid anhydrides (e.g. phthalic anhydride, chlorendic anhydride), etc.

The surface of a cured product obtained from the composition of the invention has a low critical surface tension so that it shows high water- and oil-repellency as well as excellent water resistance, oil resistance and stainproof property.

In addition, the cured product of the invention has low moisture absorption. Particularly when the amine (2) having two or more amino groups is used, the resulting composition is excellent in curability and the cured product therefrom is remarkably low in moisture absorption.

The composition of the invention may be employed, in admixture with a curing agent, as an anti-corrosive paint, a stainproof paint and an adhesive having water resistance, oil resistance and stainproof property. Further, the cured product obtained from the composition may be used as a coating film, a laminate, a material for civil engineering and construction, an insulating material, etc.

Practical and presently preferred embodiments of the present invention are illustratively shown in the following examples wherein part(s) and % are by weight unless otherwise indicated.

EXAMPLE 1 AND COMPARATIVE EXAMPLE 1

(EXAMPLE 1)

A mixture of an epoxy resin ("Epikote 828" manufactured by Shell Chemical Co.; epoxy equivalent, 184–194) (10 parts), an amine of the formula:

$$\begin{array}{c}CF_3\\ \phantom{CF_3}\diagdown\\ \phantom{CF_3CF}CF(CF_2CF_2)_3CH_2CHCH_2NHC_2NHC_4H_9\\ \phantom{CF_3}\diagup \phantom{CF(CF_2CF_2)_3CH_2C}|\\ CF_3 \phantom{CF(CF_2CF_2)_3CH_2CH}OH\end{array}$$

(0.2 part) and ethanol (50 parts) as a solvent was heated at 50° to 60° C. under stirring to obtain a uniform solution. Then, ethanol was removed off under reduced pressure to obtain an epoxy resin composition.

A mixture of the thus prepared composition (1 part) and ethylene diamine (0.07 part) was applied to the surface of an aluminum plate and cured at room temperature.

The contact angles of water and n-hexadecane on the cured film were determined, and the results are shown in Table 1.

(COMPARATIVE EXAMPLE 1)

A mixture of Epikote 828 (1 part) and ethylene-diamine (0.07 part) was cured in the same manner as in Example 1, and the contact angles of water and n-hexadecane on the cured film were determined. The results are also shown in Table 1.

TABLE 1

|  | Contact angle (°) | |
| --- | --- | --- |
|  | Water | n-Hexadecane |
| Example 1 | 98 | 52 |
| Comparative Example 1 | 71 | <10 |

EXAMPLE 2

A mixture of the epoxy resin composition obtained in Example 1 and a curing agent shown in Table 2 was cured as in Example 1, and the contact angles of water and n-hexadecane on the cured film were determined. The results are shown in Table 2.

TABLE 2

| Curing agent | Amount* (part) | Contact angle (°) | |
| --- | --- | --- | --- |
|  |  | Water | n-Hexadecane |
| Tetraethylenepentamine | 0.14 | 95 | 53 |
| Diaminodiphenylmethane | 0.26 | 102 | 52 |
| n-Dodecenylsuccinic anhydride | 1.30 | 88 | 38 |
| BF$_3$-ethylamine | 0.03 | 90 | 53 |

Note:
*The amount of the curing agent to 1 part of the composition.

EXAMPLE 3

A composition was prepared as in Example 1 but using an amine of the formula:

$$\begin{array}{c}CF_3\\ \phantom{CF_3}\diagdown\\ \phantom{CF_3CF}CF(CF_2CF_2)_nCH_2CHCH_2NHC_4H_9\\ \phantom{CF_3}\diagup \phantom{CF(CF_2CF_2)_nCH_2C}|\\ CF_3 \phantom{CF(CF_2CF_2)_nCH_2CH}OH\end{array}$$

in an amount as shown in Table 3. A mixture of the thus prepared composition (1 part) and ethylenediamine (0.07 part) was applied to the surface of an aluminum plate and cured at room temperature. The contact angles of water and n-hexadecane on the cured film were determined. The results are shown in Table 3.

TABLE 3

| n | Amount* (part) | Contact angle (°) | |
| --- | --- | --- | --- |
|  |  | Water | n-Hexadecane |
| 0 | 1 | 79 | 35 |
| 1 | 0.5 | 84 | 38 |
| 2 | 0.5 | 87 | 43 |
| 3 | 0.5 | 99 | 55 |

Note:
*The amount of the curing agent to 1 part of the composition.

EXAMPLE 4

A composition prepared from an amine of the formula:

$$\begin{array}{c}CF_3\\ \phantom{CF_3}\diagdown\\ \phantom{CF_3CF}CF(CF_2CF_2)_3CH_2CH_2NH_2\\ \phantom{CF_3}\diagup\\ CF_3\end{array}$$

(0.2 part) and an epoxy resin shown in Table 4 (10 parts) was incorporated with a curing agent and the mixture was cured on the surface of an aluminum plate to form a coating film. The contact angles of water and n-hexadecane on this cured film are shown in Table 4.

TABLE 4

| Epoxy resin | Curing agent (Amount: parts) | Contact angle (°) | |
| --- | --- | --- | --- |
|  |  | Water | n-Hexadecane |
| Epikote 828*[1] | Diaminodiphenylmethane (2.6) | 108 | 56 |
| PZ-985E*[2] | HZ-985E*[2] (10.0) | 98 | 48 |
| Epikote 1001*[1] | Diaminodiphenylmethane (2.6) | 106 | 54 |
| RXE 871*[1] | Melan 11*[3] (3.0) | 105 | 54 |
| EP-4000*[4] | Diaminodiphenylmethane (2.0) | 103 | 48 |

Note:
*[1]manufactured by Shell Chemical Corp.
*[2]manufactured by Ciba-Geigy (Japan) Ltd.
*[3]manufactured by Hitachi Chemical Co., Ltd.
*[4]manufactured by Asahi Denka Kogyo K.K.

EXAMPLE 5

A mixture of Epikote 828 (10 parts), an amine of the formula:

$$\begin{array}{c}CF_3\\ \phantom{CF_3}\diagdown\\ \phantom{CF_3CF}CF(CF_2CF_2)_3CH_2CHCH_2NHC_2H_4NH_2\\ \phantom{CF_3}\diagup \phantom{CF(CF_2CF_2)_3CH_2C}|\\ CF_3 \phantom{CF(CF_2CF_2)_3CH_2CH}OH\end{array}$$

(0.2 part) and ethanol (50 parts) as the solvent was heated at 50° to 60° C. under stirring to obtain an uniform solution. Then, ethanol was removed off under reduced pressure to obtain an epoxy resin composition.

A mixture of the thus prepared composition (1 part) and ethylenediamine (0.07 part) was applied to the surface of an aluminum plate and cured at room temperature.

The contact angles of water and n-hexadecane on the cured film were determined. The results are shown in Table 5.

TABLE 5

|  | Contact angle (°) | |
| --- | --- | --- |
|  | Water | n-Hexadecane |
| Example 5 | 95 | 50 |
| Comparative Example 1 | 71 | <10 |

EXAMPLES 6 AND 7

As in Example 5, a composition was prepared by admixing Epikote 828 and an amine of the formula:

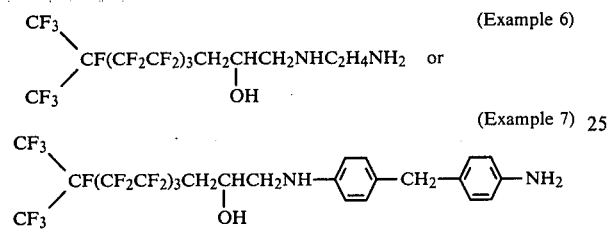

in a proportion as shown in Table 6. The thus obtained composition was admixed with ethylenediamine or tetraethylene pentamine and then cured, and the contact angles of water and n-hexadecane on the cured film were determined. The results are shown in Table 6.

The adhesive property of the cured product was estimated from the peel strength, of which determination was effected in the following manner: the mixture of the composition and the curing agent was applied to the end portion (1.25 cm) of one surface of an aluminum plate (width 2.5 cm; length 10 cm), two aluminum plates thus coated were stuck each other and cured at room temperature for 4 hours and at 80° C. for 1.5 hours, and test was effected under a pulling rate of 2 mm/min.

EXAMPLE 8

The composition obtained in Example 5 (1 part) was admixed with a curing agent, and after curing, the contact angles of water and n-hexadecane on the cured product were determined. The results are shown in Table 7.

TABLE 7

| Curing agent | Amount (part) | Contact angle (°) | |
| --- | --- | --- | --- |
|  |  | Water | n-Hexadecane |
| Tetraethylenepentamine | 0.14 | 95 | 51 |
| Diaminodiphenylmethane | 0.26 | 100 | 53 |
| BF$_3$-ethylamine | 0.03 | 103 | 55 |
| Epomate F-100*[1] | 0.34 | 98 | 52 |
| Melamine resin "Melan 27"*[2] | 0.3 | 103 | 45 |

Note:
*[1]manufactured by Mitsubishi Petrochemical Company, Ltd.
*[2]manufactured by Hitachi Chemical Co., Ltd.

EXAMPLE 9

A composition was prepared as in Example 5 but using an amine of the formula:

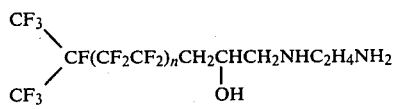

in an amount as shown in Table 8 to 10 parts of Epikote 828. A mixture of the thus prepared composition (1 part) and ethylenediamine (0.07 part) was applied to the surface of an aluminum plate and then cured at room temperature. The contact angles of water and n-hexadecane on the cured film were determined. The results are shown in Table 8.

TABLE 8

| n | Amount (part) | Contact angle (°) | |
| --- | --- | --- | --- |
|  |  | Water | n-Hexadecane |
| 0 | 1 | 78 | 33 |
| 1 | 0.5 | 82 | 39 |
| 2 | 0.5 | 87 | 42 |
| 3 | 0.5 | 97 | 52 |
| 4 | 0.2 | 101 | 54 |

TABLE 6

| Example No. | Amount*[1] (part) | Curing agent*[2] | Treatment for aluminum plate | Peel strength (kg/3cm$^2$) | Contact angle (°) | |
| --- | --- | --- | --- | --- | --- | --- |
|  |  |  |  |  | Water | n-Hexadecane |
| 6 | 0 | Ethylenediamine (7 parts) | Defatting with acetone | 165 | 71 | <10 |
|  | 0.3 |  |  | 155 | 93 | 50 |
|  | 1.5 |  |  | 150 | 95 | 50 |
|  | 5 |  |  | 190 | 95 | 49 |
|  | 15 |  |  | 160 | 96 | 53 |
| 7 | 1.5 | Ethylenediamine (7 parts) | Defatting with acetone | 176 | 99 | 53 |
|  | 0 | Tetraethylenepentamine (14 parts) | 80 mesh blast | 226 | 72 | <10 |
|  | 0.3 |  |  | 230 | 98 | 53 |
|  | 1.5 |  |  | 240 | 99 | 52 |
|  | 5 |  |  | 205 | 98 | 54 |
|  | 15 |  |  | 250 | 101 | 55 |

Note:
*[1]The amount of the amine to 100 parts of Epikote 828.
*[2]The amount of the curing agent to 100 parts of composition.

TABLE 8-continued

| n | Amount (part) | Contact angle (°) | |
|---|---|---|---|
| | | Water | n-Hexadecane |
| Comparative Example 1 | 71 | <10 | |

EXAMPLES 10 TO 13

A composition was prepared by admixing Epikote 828 (100 parts) with an amine of the formula:

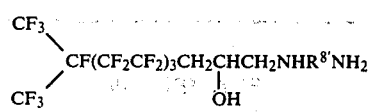

$$CF_3{\diagdown}\atop{CF_3{\diagup}}CF(CF_2CF_2)_3CH_2\underset{OH}{\overset{|}{C}H}CH_2NHR^8{'}NH_2$$

in an amount as shown in Table 9. The thus prepared composition (1 part) was incorporated with diaminodiphenylmethane (0.26 part), and the mixture was, after dissolved at 80° C., applied to the surface of an aluminum plate and cured at 150° C. for 2 hours. The contact angles of water and n-hexadecane on the cured film were determined. The results are shown in Table 9.

TABLE 9

| Example No. | $R^{8'}$ | Contact angle (°) | Amount (part) | | | | | |
|---|---|---|---|---|---|---|---|---|
| | | | 0.1 | 0.3 | 2 | 5 | 10 | 15 | 30 |
| 10 | —⟨⟩—CH₂—⟨⟩— | Water | 105 | 103 | 105 | 108 | 106 | 106 | 108 |
| | | n-Hexadecane | 55 | 57 | 57 | 58 | 57 | 57 | 58 |
| 11 | —C₂H₄— | Water | — | 103 | 102 | 103 | 102 | 103 | 103 |
| | | n-Hexadecane | — | 55 | 55 | 56 | 56 | 55 | 57 |
| 12 | —C₆H₁₂— | Water | — | — | 101 | 101 | — | 104 | 103 |
| | | n-Hexadecane | — | — | 53 | 55 | — | 56 | 56 |
| 13 | —(CH₂)₃CH(OCH₂)(OCH₂)C(CH₂O)(CH₂O)CH(CH₂)₃— | Water | — | — | 103 | 103 | 102 | 102 | 103 |
| | | n-Hexadecane | — | — | 51 | 55 | 53 | 54 | 55 |

EXAMPLE 14

Epikote 828 (10 parts) and an amine of the formula:

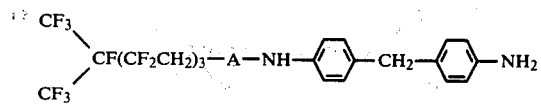

$$CF_3{\diagdown}\atop{CF_3{\diagup}}CF(CF_2CH_2)_3{-}A{-}NH{-}⟨⟩{-}CH_2{-}⟨⟩{-}NH_2$$

wherein A is as shown in Table 10 (0.2 part) was admixed with diaminodiphenylmethane and cured as in Example 10 to 13. The contact angles of water and n-hexadecane on the cured film were determined. The results are shown in Table 10.

TABLE 10

| A | Contact angle (°) | |
|---|---|---|
| | Water | n-Hexadecane |
| —CH₂CH(OH)CH₂— | 105 | 57 |
| —CH₂CH₂— | 106 | 62 |
| —CO— | 106 | 55 |

EXAMPLE 15

A composition was prepared by admixing an amine of the formula:

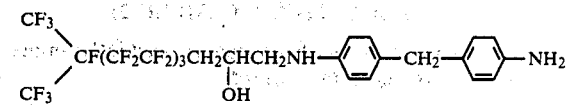

$$CF_3{\diagdown}\atop{CF_3{\diagup}}CF(CF_2CF_2)_3CH_2\underset{OH}{\overset{|}{C}H}CH_2NH{-}⟨⟩{-}CH_2{-}⟨⟩{-}NH_2$$

with Epikote 828 as shown in Table 11. The thus prepared composition was incorporated with a curing agent and then subjected to curing. The contact angles of water and n-hexadecane on the cured product were determined. The results are shown in Table 11.

TABLE 11

| Composition | Amount (part) | Curing agent | Amount (part) | Contact angle (°) | |
|---|---|---|---|---|---|
| | | | | Water | n-Hexadecane |
| Epikote 828 Amine | 100 5 | Diaminodiphenylmethane | 26 | 109 | 58 |
| PZ-985E Amine | 100 1.5 | HZ-985E | 100 | 86 | 36 |
| PZ-985E Amine | 100 15 | HZ-985E | 100 | 105 | 65 |

EXAMPLE 16 AND COMPARATIVE EXAMPLE 2

(EXAMPLE 16)

An an epoxide of the formula:

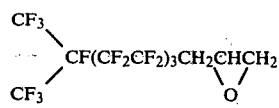

$$CF_3{\diagdown}\atop{CF_3{\diagup}}CF(CF_2CF_2)_3CH_2\underset{O}{\overset{\diagdown\diagup}{CHCH_2}}$$

(1 part) was reacted with diaminodiphenylmethane (2 parts) to obtain an amine of the formula:

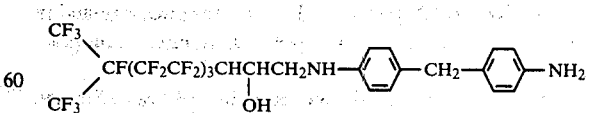

$$CF_3{\diagdown}\atop{CF_3{\diagup}}CF(CF_2CF_2)_3CHCH_2NH{-}⟨⟩{-}CH_2{-}⟨⟩{-}NH_2{\atop{|\atop OH}}$$

which was then admixed with Epikote 828 (100 parts) and diaminodiphenylmethane (24 parts) and heated at 80° C. to obtain a uniform solution. The thus obtained solution was applied to the surface of an aluminum plate and cured at 150° C. for 2 hours to obtain a uniform cured product.

(COMPARATIVE EXAMPLE 2)

All of the three materials substances used in Example 16, i.e. the epoxide of the formula:

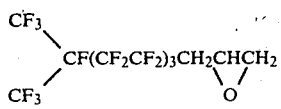

(1 part), Epikote 828 (100 parts) and diaminodiphenylmethane (26 parts), were mixed together and heated under stirring, whereby Epikote 828 and the epoxide were not miscible each other to cause separation of layers, unlike Example 16, and curing of Epikote 828 took place in the state of layer-separation.

EXAMPLE 17

Epikote 828 as an epoxy resin and a compound of the formula:

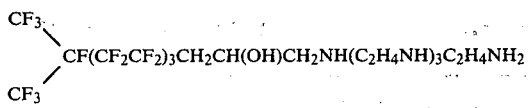

in amounts as shown in Table 12 were added to anhydrous ethanol (100 parts). The mixture was stirred at 80° C. for 13 hours, and then ethanol was removed off at about 80° C. under a reduced pressure of 20 to 15 mmHg to obtain an epoxy resin composition.

The thus obtained composition (1 part) was admixed with diaminodiphenylmethane (0.26 part) and stirred at 80° C. to make a uniform mixture, which was applied to an aluminum plate and then cured at 150° C. for 2 hours. The contact angles of water and n-hexadecane on the cured film were determined. The results are shown in Table 12.

TABLE 12

| Epoxy resin (part) | Amine (part) | Contact angle (°) Water | n-Hexandecane |
|---|---|---|---|
| 100 | 2 | 100 | 51 |
| 100 | 5 | 100 | 51 |
| 100 | 15 | 100 | 53 |
| 100 | 30 | 101 | 52 |
| 100 | 0 | 72 | <10 |

EXAMPLE 18

The same epoxy resin (100 parts) and the same polyamine (2 parts) as in Example 17 were added to anhydrous ethanol (100 parts), and the mixture was treated in the same manner as in Example 17 to obtain a composition.

Each curing agent shown in Table 13 was admixed with one part of the thus obtained composition and stirred at room temperature or in case of BF$_3$-ethylamine at 80° C. to obtain a uniform solution, which was cured according to the curing schedule as shown in Table 13. The contact angles of water and n-hexadecane on the cured product were determined. The results are shown in Table 13.

TABLE 13

| Curing agent | Amount (part) | Contact angle (°) Water | n-Hexadecane | Curing schedule |
|---|---|---|---|---|
| Ethylenediamine | 0.07 | 95 | 52 | 4 hours at room temp. (under stream of nitrogen) |
| n-Dodecenylsuccinic anhydride | 1.30 | 88 | 38 | 20 hours at 150° C. |
| BF$_3$-ethylamine | 0.03 | 91 | 55 | 2 hours at 150° C. |

EXAMPLE 19

A composition was prepared in the same manner as in Example 17 but using a compound of the formula:

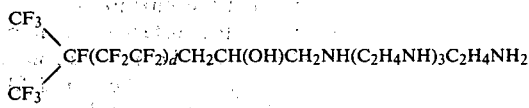

as the polyamine. The thus prepared composition (1 part) was admixed with ethylenediamine (0.07 part) and stirred at room temperature to obtain a uniform mixture, which was applied to an aluminum plate and cured at room temperature for 4 hours. The contact angles of water and n-hexadecane on the cured film were determined. The results are shown in Table 14.

TABLE 14

| d | Epoxy resin (part) | Polyamine resin (part) | Contact angle (°) Water | n-Hexadecane |
|---|---|---|---|---|
| 1 | 100 | 5 | 80 | 38 |
| 2 | 100 | 5 | 93 | 42 |
| 3 | 100 | 5 | 96 | 50 |

EXAMPLE 20

A compound of the formula:

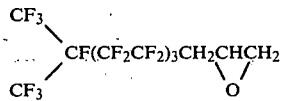

(a)

were reacted with tetraethylenepentamine (b) in a proportion as shown in Table 15 at 130° C. for 16 hours in ethanol. The gas chromatography analysis of the reaction product showed the absence of (a).

The thus obtained reaction product (0.2 part) and Epikote 828 (10 parts) were added to anhydrous ethanol, and the mixture was stirred at 80° C. for 13 hours. Then, ethanol was removed off at about 80° C. under a reduced pressure of 15 to 20 mmHg.

The thus prepared composition (1 part) was admixed with tetraethylenepentamine (0.14 part) and stirred at room temperature to obtain a uniform mixture, which was applied to an aluminum plate and cured at room temperature for 4 hours. The contact angles of water and n-hexadecane on the cured film were determined. The results are shown in Table 15.

TABLE 15

| Molar ratio | | Contact angle (°) | |
|---|---|---|---|
| (a) | (b) | Water | n-Hexadecane |
| 1.0 | 1.0 | 95 | 52 |
| 1.5 | 1.0 | 103 | 55 |
| 2.0 | 1.0 | 103 | 56 |

EXAMPLE 21

An epoxy resin shown in Table 16 (10 parts) and an amine of the formula:

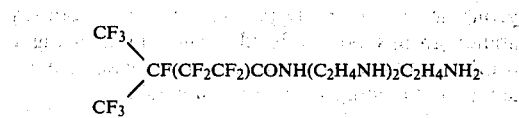

$CF(CF_2CF_2)CONH(C_2H_4NH)_2C_2H_4NH_2$ (0.2 part) were added to anhydrous ethanol (10 parts), and the mixture was stirred at 80° C. for 13 hours. Then, ethanol was removed off at about 80° C. under a reduced pressure of 15 to 20 mmHg.

The thus obtained composition was admixed with a curing agent shown in Table 16 and stirred at 80° C. to obtain a uniform mixture, which was applied to an aluminum plate and cured. On the cured film, the contact angles of water and n-hexadecane were determined. The results are shown in Table 16.

TABLE 16

| Epoxy resin | Curing agent (part(s)) | Curing schedule Temp. (°C.) | Curing schedule Time (hr) | Contact angle (°) Water | Contact angle (°) n-Hexa- decane |
|---|---|---|---|---|---|
| Epikote 1001 | Diamino- diphenyl (26) | 150 | 2 | 103 | 52 |
| EP-4000 | Diamino- diphenyl (20) | 150 | 2 | 98 | 50 |
| RXE-871 | Melan H (30) | 180 | 2 | 108 | 56 |

What is claimed is:

1. An epoxy resin composition comprising:
   (1) an epoxy resin containing two or more epoxy groups per molecule and
   (2) an amine containing at least one perfluoroalkyl group and one or more primary and/or secondary amino groups per molecule of the formula:

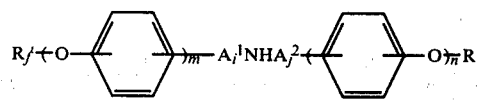

wherein $R_f$ is a $C_1$–$C_{15}$ perfluoroalkyl group, R is a hydrogen atom, a $C_1$–$C_{16}$ alkyl group, a phenyl group having or not 1 to 4 substituents selected from the group consisting of halogen atoms and $C_1$–$C_4$ alkyl groups, a phenyl($C_1$–$C_4$) alkyl group having or not on the benzene ring 1 to 4 substituents selected from the group consisting of halogen atoms and $C_1$–$C_4$ alkyl groups, a tri($C_1$–$C_3$) alkoxysilyl group or a $C_1$–$C_{15}$ perfluoroalkyl group, $A^1$ and $A^2$ are each a $C_1$–$C_4$ alkylene group, a $C_2$–$C_4$ alkylene group substituted with one or two hydroxyl groups, a methyleneoxy($C_3$–$C_4$)alkylene group in which one of the hydrogen atoms in the alkylene moiety is substituted with a hydroxyl group or a phenylene group and i, j, m and n are each 0 or 1, at least one of them being 1.

2. An epoxy resin composition comprising:
   (1) an epoxy resin containing two or more epoxy groups per molecule and
   (2) an amine containing at least one perfluoroalkyl group and one or more primary and/or secondary amino groups per molecule, said amine being a condensation or an addition product between ammonia or a primary monoamine and a compound of the formula:

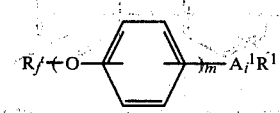

wherein $R^1$ is —$CHCH_2$, an iodine atom or a chlorine atom, $R_f$ is a $C_1$–$C_{15}$ perfluoroalkyl group, $A^1$ is a $C_1$–$C_4$ alkylene group, a $C_2$–$C_4$ alkylene group substituted with one or two hydroxyl groups, a methyleneoxy($C_3$–$C_4$)alkylene group in which one of the hydrogen atoms in the alkylene moiety is substituted with a hydroxyl group or a phenylene group and i and m are each 0 or 1, at least one of them being 1.

3. The composition according to claim 2, wherein the monoamine is selected from the group consisting of methylamine, ethylamine, propylamine, butylamine, pentylamine, hexylamine, octylamine, hydroxyethylamine, trialkylsilylethylamine and aniline.

4. An epoxy resin composition comprising:
   (1) an epoxy resin containing two or more epoxy groups per molecule and
   (2) an amine containing at least one perfluoroalkyl group and one or more primary and/or secondary amino groups per molecule of the formula:

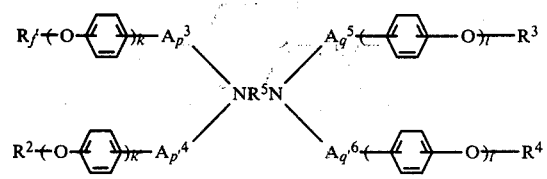

wherein $R_f$ is a $C_1$–$C_{15}$ perfluoroalkyl group, $R^2$, $R^3$ and $R^4$ are each a hydrogen atom, a $C_1$–$C_{16}$ alkyl group, a phenyl group having or not 1 to 4 substituents selected from the group consisting of halogen atoms and $C_1$–$C_4$ alkyl groups, a phenyl(-$C_1$–$C_4$)alkyl group having or not on the benzene ring 1 to 4 substituents selected from the group consisting of halogen atoms and $C_1$–$C_4$ alkyl groups, a tri($C_1$–$C_3$)alkoxysilyl group or a $C_1$–$C_{15}$ perfluoroalkyl group, $R^5$ is a $C_1$–$C_8$ alkylene group, —$(CH_2)_r$O($C_sH_{2s}$O)$_r$—$(CH_2)_r$—(r, s and t being each an integer of 1 to 8),

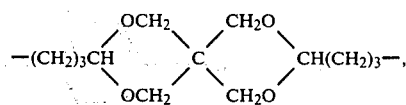

-continued

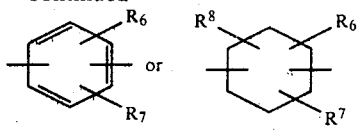

($R^6$, $R^7$ and $R^8$ being each a hydrogen atom, a methyl group, a methoxy group, a chlorine atom or a bromine atom),

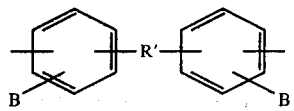

($R'$ being an oxygen atom, a sulfur atom, a sulfonyl group or a $C_1$–$C_4$ alkylene, and B being a methyl group, a methoxy group, a chlorine atom or a bromine atom),

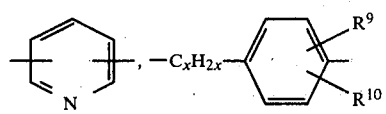

($R^9$ and $R^{10}$ being each a hydrogen atom, a methyl group or a methoxy group and x being an integer of 1 to 4),

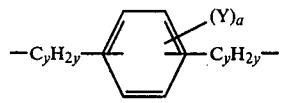

(Y being a chlorine atom or a bromine atom, y being an integer of 1 to 4 and a being an integer of 1 to 3) or

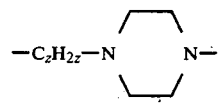

(z being an integer of 1 to 4), $A^3$, $A^4$, $A^5$ and $A^6$ are each a $C_1$–$C_4$ alkylene group, a $C_2$–$C_4$ alkylene group substituted with one or two hydroxyl groups, a methyleneoxy($C_3$–$C_4$)alkylene group in which one of the hydrogen atoms in the alkylene moiety is substituted with a hydroxyl group or a phenylene group, k, k', l, l', p, p', q and q' are each 0 or 1, at least one of them being 1.

5. An epoxy resin composition comprising:
   (1) an epoxy resin containing two or more epoxy groups per molecule and
   (2) an amine containing at least one perfluoroalkyl group and one or more primary and/or secondary amino groups per molecule, said amine being a product obtained by the reaction between a diamine and a compound of the formula:

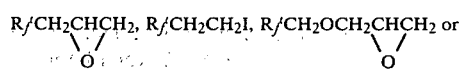

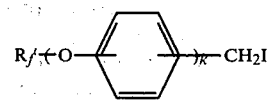

wherein $R_f$ is a $C_1$–$C_{15}$ perfluoroalkyl group and k is an integer of 0 or 1.

6. The composition according to claim 5, wherein the diamine is selected from the group consisting of polymethylenediamine, polyether diamine, branched polymethylenediamine, diethylaminopropylamine, aminoethylethanolamine, methyliminobispropylamine, menthane diamine, N-aminoethylpiperazine, 1,3-diaminocyclohexane, isophorone diamine, m-xylylene diamine, tetrachloro-p-xylylenediamine, o-, m- or p-phenylenediamine, diaminodiphenylmethane, diaminodiphenyl ether, diaminodiphenyl sulfone, benzidine, 4,4'-bis(o-toluidine), 4,4'-thiodianiline, dianisidine, methylenebis(o-chloroaniline), 2,4-toluenediamine, bis(3,4-diaminophenyl)sulfone, diaminopyridine, diaminoditolylsulfone, 4-chloro-o-phenylenediamine and m-aminobenzylamine.

7. An epoxy resin composition comprising:
   (1) an epoxy resin containing two or more epoxy groups per molecule and
   (2) an amine containing at least one perfluoroalkyl group and one or more primary and/or secondary amino groups per molecule of the formula:

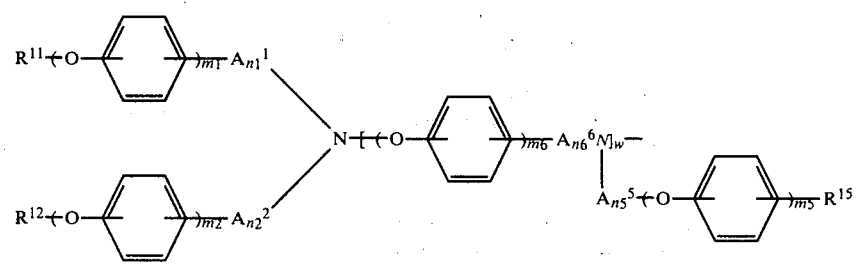

-continued

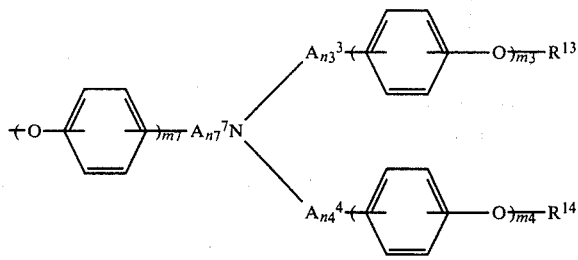

wherein $R^{11}$, $R^{12}$, $R^{13}$, $R^{14}$ and $R^{15}$ are each a hydrogen atom, a $C_1$-$C_{16}$ alkyl group, a phenyl group having or not 1 to 4 substituents selected from the group consisting of halogen atoms and $C_1$-$C_4$ alkyl groups, a phenyl($C_1$-$C_4$)alkyl group having or not on the benzene ring 1 to 4, substituents selected from the group consisting of halogen atoms and $C_1$-$C_4$ alkyl groups, a tri($C_1$-$C_3$)alkoxysilyl group or a $C_1$-$C_{15}$ perfluoroalkyl group, at least one of them being a perfluoroalkyl group, $A^1$, $A^2$, $A^3$, $A^4$, $A^5$, $A^6$, and $A^7$ are each a $C_1$-$C_4$ alkylene group, a $C_2$-$C_4$ alkylene group substituted with one or two hydroxyl groups, a methyleneoxy($C_3$-$C_4$)alkylene in which one of the hydrogen atoms in the alkylene moiety is substituted with a hydroxyl group or a phenylene group, $m_1$, $m_2$, $m_3$, $m_4$, $m_5$, $m_6$, $m_7$, $n_1$, $n_2$, $n_3$, $n_4$, $n_5$, $n_6$ and $n_7$ are each 0 or 1, at least one of m and n for R representing a perfluoroalkyl group being 1 and w is an integer of 1 to 10.

8. An epoxy resin composition comprising:
(1) an epoxy resin containing two or more epoxy groups per molecule and
(2) an amine containing at least one perfluoroalkyl group and one or more primary and/or secondary amino groups per molecule, said amine being an addition product or a condensation product between a polyamine containing no perfluoroalkyl group and a compound of the formula:

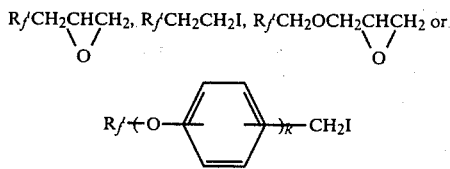

wherein $R_f'$ is a $C_1$-$C_{15}$ perfluoroalkyl group and k is an integer of 0 or 1.

9. The composition according to claim 8, wherein the polyamine containing no perfluoroalkyl group is selected from the group consisting of diethylenetriamine, triethylenetetramine, tetraethylene pentamine, pentaethylene hexamine, iminobispropylamine, bishexamethylenetriamine, methyliminobispropylamine, bis(3,4-diaminophenyl)sulfone, low molecular weight polymers of melamine resin, low molecular weight polymers of urea resin and low molecular weight polymers of amide resin.

10. The composition according to claim 1, 2, 4, 5, 7 or 8, wherein the epoxy resin (1) is a polyglycidyl ether or ester of a polyhydroxy or polycarboxy compound.

11. The composition according to claim 1, 2, 4, 5, 7 or 8, wherein the epoxy resin (1) is a polyglycidyl ether of a polyhydric phenol.

12. The composition according to claim 11, wherein the polyhydric phenol is 4,4'-dihydroxydiphenyldimethylmethane.

13. The composition according to claim 1, 2, 4, 5, 7 or 8, wherein the epoxy resin (1) is a compound of the formula:

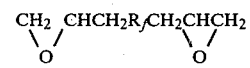

wherein $R_f$ is a $C_4$-$C_{16}$ perfluoroalkylene group.

14. An epoxy resin composition according to claim 1, 2, 4, 5, 7 or 8, wherein said composition is a curable composition wherein the epoxy resin (1) and the amine (2) are present in a simply admixed state or in a combined state forming a compound, said compound being composed wholly or almost wholly of non-crosslinked linear structures containing epoxy groups.

15. The composition according to claim 1, 2, 4, 5, 7, or 8, wherein the mixing proportion of the epoxy resin (1) and the amine (2) is from 99.99:0.01 to 50:50 by weight.

16. The composition according to claim 15, wherein the mixing proportion of the epoxy resin (1) and the amine (2) is from 99.9:0.1 to 75:25 by weight.

* * * * *